United States Patent
Patton et al.

(10) Patent No.: US 10,718,339 B2
(45) Date of Patent: Jul. 21, 2020

(54) PERIPHERAL DRIVE CENTRIFUGAL FAN

(71) Applicant: Apple Inc., Cupertino, CA (US)

(72) Inventors: Brad L. Patton, Campbell, CA (US); Anthony J. Aiello, Santa Cruz, CA (US); Jesse T. Dybenko, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 586 days.

(21) Appl. No.: 15/183,664

(22) Filed: Jun. 15, 2016

(65) Prior Publication Data

US 2017/0067470 A1    Mar. 9, 2017

Related U.S. Application Data

(60) Provisional application No. 62/214,125, filed on Sep. 3, 2015.

(51) Int. Cl.
*F04D 25/06* (2006.01)
*F04D 17/10* (2006.01)
*G06F 1/20* (2006.01)

(52) U.S. Cl.
CPC ............ *F04D 17/10* (2013.01); *F04D 25/06* (2013.01); *G06F 1/203* (2013.01); *G06F 1/206* (2013.01); *F04D 25/0653* (2013.01)

(58) Field of Classification Search
CPC .. H02K 3/26; H02K 3/28; H02K 21/028–029; H02K 21/24; F04D 25/0693; F04D 25/0653
See application file for complete search history.

(56) References Cited

U.S. PATENT DOCUMENTS

| | | | | |
|---|---|---|---|---|
| 4,814,675 A | * | 3/1989 | Perilhon | H02H 7/0833 318/400.11 |
| 4,949,022 A | | 8/1990 | Lipman | |

(Continued)

FOREIGN PATENT DOCUMENTS

| | | |
|---|---|---|
| JP | S59-059062 A | 4/1984 |
| JP | S61-210858 A | 9/1986 |

(Continued)

OTHER PUBLICATIONS

Office Action (English Translation) dated Aug. 10, 2017 in Japanese Patent Application No. 2016-171895, 5 pages.

(Continued)

*Primary Examiner* — Charles G Freay
*Assistant Examiner* — Thomas Fink
(74) *Attorney, Agent, or Firm* — Kilpatrick Townsend and Stockton LLP

(57) ABSTRACT

Electronic devices have peripheral drive centrifugal fans having smaller hubs and increased air flows to manage heat levels within the electronic device. A peripheral drive centrifugal fan includes a fan housing, an impeller including a plurality of blades, and a plurality of stacked inductor groups radially disposed about the impeller. Some of the blades have magnetically active portions. Each stacked inductor group includes first and second coils configured to impart a variable magnetic force to the magnetically active portion of a blade to drive the impeller along a rotational direction. The first and second coils can be selectively energizable independently from each other to provide greater control of the impeller.

17 Claims, 12 Drawing Sheets

(56) References Cited

U.S. PATENT DOCUMENTS

| | | | |
|---|---|---|---|
| 5,107,159 A * | 4/1992 | Kordik | H02K 1/146 310/156.44 |
| 5,514,923 A * | 5/1996 | Gossler | H02J 7/14 310/113 |
| 5,616,974 A | 4/1997 | Yamada | |
| 5,760,521 A * | 6/1998 | Ushiro | H02K 7/116 310/156.32 |
| 6,351,044 B1 * | 2/2002 | Miyahara | F04D 25/0653 257/E23.099 |
| 6,388,346 B1 | 5/2002 | Lopatinsky et al. | |
| 6,575,717 B2 * | 6/2003 | Ozaki | F04D 29/048 310/90.5 |
| 6,713,924 B1 * | 3/2004 | Fukushima | H02K 21/24 310/159 |
| 6,896,492 B2 | 5/2005 | Masterton | |
| 6,903,928 B2 * | 6/2005 | Lopatinsky | F04D 17/04 165/121 |
| 7,075,200 B2 | 7/2006 | Minato et al. | |
| 7,147,438 B2 | 12/2006 | DePaoli | |
| 7,167,364 B2 * | 1/2007 | Lopatinsky | H01L 23/467 165/122 |
| 7,623,013 B2 * | 11/2009 | Lopatinsky | A63H 18/10 310/156.32 |
| 10,135,310 B2 * | 11/2018 | Schuler | H02K 3/521 |
| 10,186,922 B2 * | 1/2019 | Schuler | H02K 3/26 |
| 2003/0020353 A1 * | 1/2003 | Lopatinsky | H02K 1/2793 310/208 |
| 2003/0231468 A1 | 12/2003 | Lopatinsky et al. | |
| 2004/0245866 A1 * | 12/2004 | Lopatinsky | F04D 17/04 310/64 |
| 2005/0002163 A1 * | 1/2005 | Lopatinsky | H01L 23/467 361/697 |
| 2005/0057112 A1 * | 3/2005 | Lopatinsky | F04D 25/066 310/208 |
| 2005/0285470 A1 * | 12/2005 | Itoh | H02K 3/26 310/208 |
| 2006/0021735 A1 | 2/2006 | Lopatinsky et al. | |
| 2007/0104593 A1 * | 5/2007 | Yamaguchi | F04D 29/281 417/354 |
| 2008/0018187 A1 * | 1/2008 | Yamaguchi | H02K 1/182 310/81 |
| 2010/0098560 A1 * | 4/2010 | Horng | F04D 25/0653 417/352 |
| 2010/0316509 A1 * | 12/2010 | Horng | F04D 25/0653 417/352 |
| 2014/0232246 A1 * | 8/2014 | Sugiura | H02K 5/15 310/68 R |
| 2018/0106259 A1 * | 4/2018 | Lin | H02K 1/27 |
| 2018/0323689 A1 * | 11/2018 | Schuler | H02K 5/04 |
| 2019/0006925 A1 * | 1/2019 | Noble | H02K 21/24 |

FOREIGN PATENT DOCUMENTS

| | | |
|---|---|---|
| JP | 2003-193994 | 7/2003 |
| JP | 2006-246561 A | 9/2006 |
| JP | 2007-124853 A | 5/2007 |
| JP | 2010-057229 A | 3/2010 |

OTHER PUBLICATIONS

Office Action (English Translation) dated Aug. 22, 2017 in Korean Patent Application No. 10-2016-0112465, 6 pages.

"Examination Report", Australian Patent Application No. 2016222500, dated May 15, 2017, 3 pages.

"Extended European Search Report", European Patent Application No. 16186536.5, dated May 15, 2017, 11 pages.

"Invitation to Proceed", European Patent Application No. 16186536.5, dated Jun. 20, 2017, 2 pages.

"Partial Search Report", European Patent Application No. 16186536.5, dated Feb. 10, 2017, 8 pages.

Office Action (English translation) dated Feb. 3, 2019 in Chinese Patent Application No. 201610788857.3, 15 pages.

Decision to Grant dated Aug. 22, 2019 in CN Application No. ZL201610788857.3. 6 pages (includes English translation of allowed claims).

* cited by examiner

PERIPHERAL DRIVE CENTRIFUGAL FAN

CROSS-REFERENCE TO RELATED APPLICATION

This application claims the benefit of U.S. Provisional Patent Application No. 62/214,125, filed on Sep. 3, 2015, which is incorporated by reference herein in its entirety for all purposes.

FIELD

The described embodiments relate generally to electronic devices, and more particularly to cooling fans for electronic devices.

BACKGROUND

As recent models of electronic devices are becoming increasingly faster and more powerful, they are also becoming sleeker and smaller in size. Consumer preferences and demands tend to drive both of these trends toward faster and smaller. Electronic device makers are thus faced with the challenges of incorporating faster and more powerful electronic chips and circuitry into smaller electronic device offerings.

Electronic devices contain components that produce heat during normal operation. Fans, heat sinks, and/or other heat management components are used to reduce heat. But, increasingly faster and more powerful chips and integrated circuitry can generate more heat than previous generations of electronics. Placement of these components into smaller overall volumes can create new challenges.

SUMMARY

Representative embodiments set forth herein disclose various structures and arrangements for the disclosed peripheral drive centrifugal fans configured for use in an electronic device. In particular, the disclosed embodiments set forth a centrifugal fan driven by electromagnetic components that are located about the periphery of an impeller structure. In addition to resulting in an impeller having a smaller hub and therefore the potential for increased air flow, the disclosed embodiments also include driving components that result in better motor efficiencies, increased control, and variable levels of power.

According to various embodiments, a peripheral drive centrifugal fan can have an impeller hub of a reduced size and driving components that are located near the exterior of the fan impeller. Magnetic components can be included at or about the outer portions of at least some of the impeller blades, and a plurality of stacked inductor groups having multiple coils each can be distributed radially about the exterior or circumference of the impeller. The stacked inductor group coils can be energized selectively and independently for greater impeller control and differing impeller speeds and heat reduction levels. Further, the stacked inductor groups and impeller blades having magnetic components thereat can be spaced apart in patterns that are symmetric or asymmetric, so as to provide additional efficiencies for fan operations.

This Summary merely provides some exemplary embodiments so as to provide a basic understanding of some aspects of the subject matter described herein. Accordingly, it will be appreciated that the above-described features are merely examples and should not be construed to narrow the scope or spirit of the subject matter described herein in any way. For example, the subject fans can be axial, mixed-flow or other types of fans, and the stacked inductor groups can be electromagnets, coils, and/or other types of components, as may be suitable. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed peripheral drive centrifugal fans configured for use in an electronic device. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
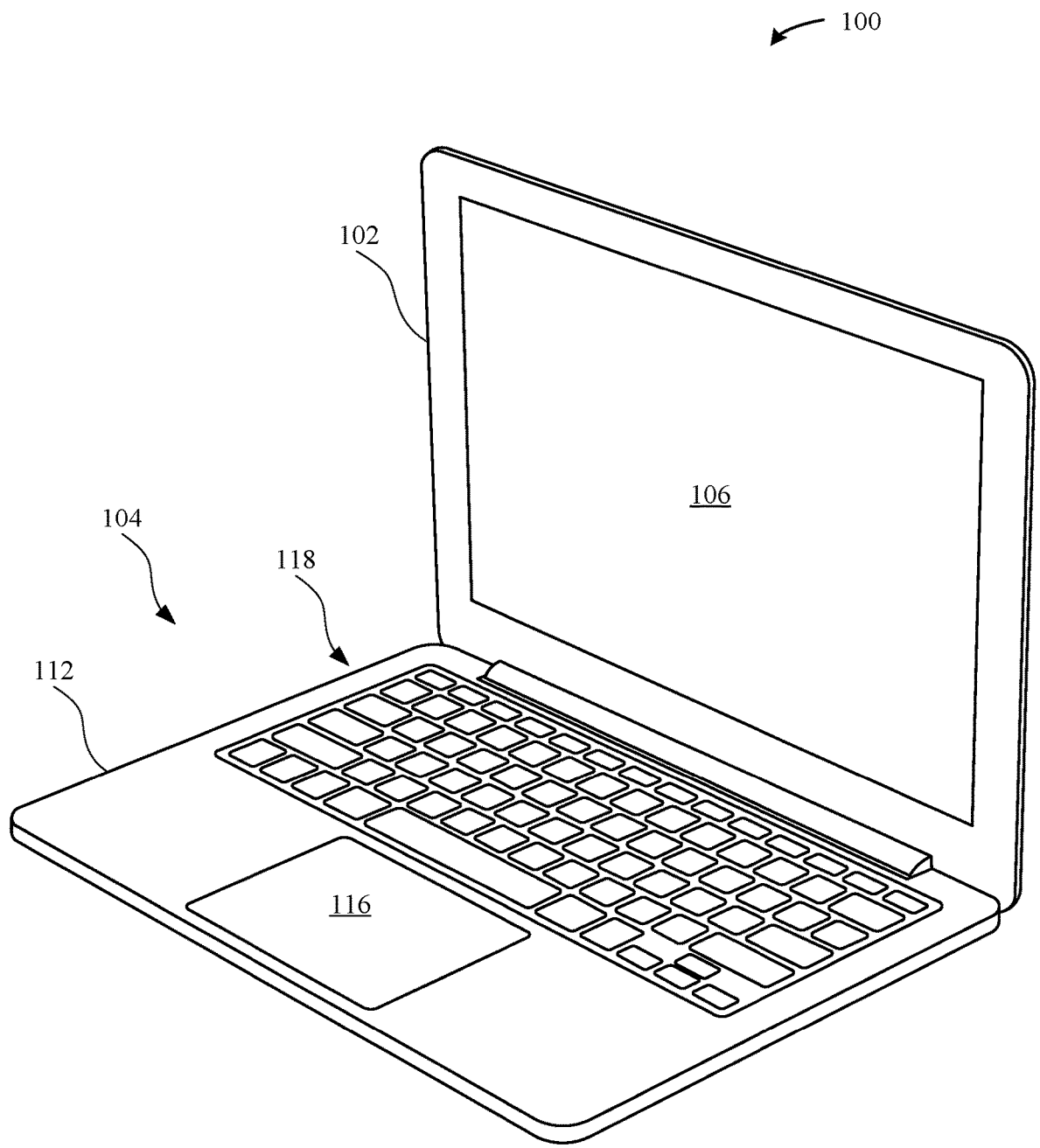
FIG. 1 illustrates in front perspective view an exemplary electronic device according to various embodiments of the present disclosure.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Electronic devices contain components that produce heat during normal operation. As such, fans, heat sinks, and other heat diversion components are used to manage operating temperatures in some electronic devices. Heat producing components generate heat at increasing levels, and ongoing consumer demands require that devices become smaller and sleeker, such that fans and other components need to be smaller and more efficient. While many small fan designs utilize impellers driven by motors that are located within the impeller hub, such hub-based motors can obstruct the fan inlet zone, thereby inducing aerodynamic pressure losses before air enters the impeller blades. This can result in reduced airflow and increased aeroacoustic noise. There is a desire for improved fan designs that require less power, less space, and/or more open and less impeded air inlets, while still delivering acceptable levels of device heat management.

Accordingly, the embodiments set forth herein provide various structures and arrangements for peripheral drive centrifugal fans usable in an electronic device. According to various embodiments, a peripheral drive centrifugal fan can have an impeller hub of a reduced size, which can result in increased air flow through the fan. Fan driving components are then located near the exterior of an impeller, with inductor groups having multiple coils that are stacked and that can be energized independently for greater impeller control. Stacked inductor groups and impeller blades having magnetic components therein can be spaced apart in patterns that are symmetric or asymmetric, so as to provide additional efficiencies for fan operation.

The foregoing approaches provide various structures and arrangements for the disclosed peripheral drive centrifugal fans configured for use in an electronic device. A more detailed discussion of these features and techniques is set forth below and described in conjunction with FIGS. 1-12, which illustrate detailed diagrams of devices and components that can be used to implement these features and techniques.

In some embodiments, a peripheral drive centrifugal fan includes driving coils or other inductors near the exterior of an impeller in order to provide space for more air to enter the center of the centrifugal fan. Magnets (or magnetizable materials) can be included at the end of various impeller blades, and the driving inductors can be located on or about a housing of the fan proximate to the magnets. Each of the driving inductors can receive a driving current that causes the driving inductors to oppose and/or attract the magnets and thereby move the impeller, such as in a rotational direction. In some embodiments, the driving inductors can be stacked into inductor groups in order to increase the electromagnetic force experienced by the magnets on various impeller blades. Additionally, the magnets and stacked inductor groups can be arranged in patterns (symmetrically or asymmetrically) about the impeller perimeter in order to drive the rotational motion of the impeller when the driving inductors are receiving an alternating current or a direct current with varying amplitudes or magnitudes.

Although the various embodiments set forth herein illustrate and describe centrifugal fans driven by inductor groups having coils, it will be readily appreciated that the concepts set forth in this disclosure are not limited to such implementations. For example, that which is disclosed can be applied to axial, mixed-flow, and other types of fans besides centrifugal fans. Also, while the disclosed electromagnets can function as driving inductors, such coils or other electromagnets may also provide other functionalities, and may be of any suitable shape, size, or location. In addition, the term "magnets" as used herein may refer to permanent magnets and/or electromagnets, as may be suitable for a given application. Further, the interactive component groups of the present disclosure may be applied to other similar driving or motor based technologies, which may include hysteresis motors, reluctance motors, electrostatic motors, and so forth.

Turning first to FIG. 1, an exemplary electronic device is illustrated in front perspective view. In various embodiments, an electronic device suitable for use with the disclosed peripheral drive centrifugal fans can include a desktop computing device with a built-in display, a portable computing device, or a video-streaming device, for example. In the embodiment shown in FIG. 1, electronic device 100 can be a consumer electronic device such as a laptop computer. As shown, the electronic device 100 includes a display housing 102 coupled with a base portion 104, allowing the display housing 102 to pivot with respect to the base portion 104. In some embodiments, the display housing 102 and the base portion 104 are formed from a metal, such as aluminum. The display housing 102 may include a display panel 106 designed to provide visual content. The base portion 104 may include a top case 112 coupled with a bottom case (not shown). The top case 112 and the bottom case may define a space designed to receive several components of the electronic device 100, such as processor circuits, memory circuits, and a battery pack. Also, the base portion 104 may further include several components allowing a user to input one or more controls to the electronic device 100, such as a touch pad 116 and a keyboard 118. During use of the electronic device 100, some of these components may convert electrical energy into heat, causing an increase in the temperature of the electronic device 100. To reduce the temperature, the base portion 104 may also include a fan (not shown).

Figure 2A:
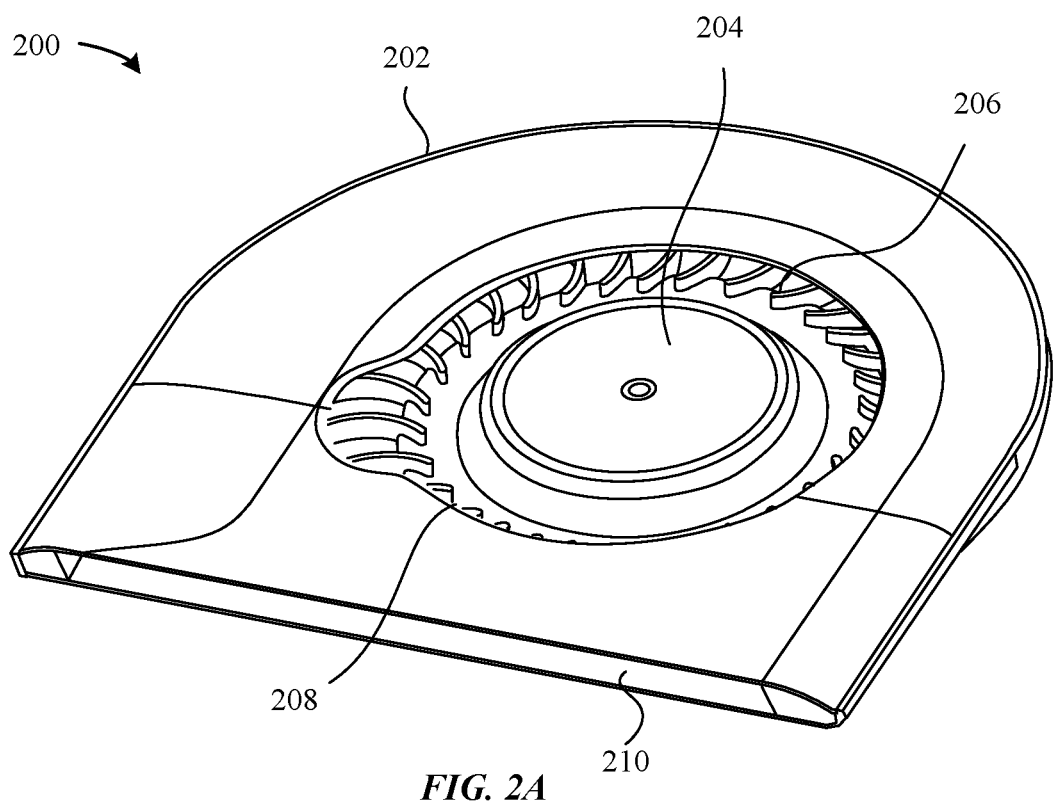
FIG. 2A illustrates in front perspective view an exemplary cooling fan suitable for use in the exemplary electronic device of FIG. 1.

FIG. 2A illustrates in front perspective view an exemplary cooling fan suitable for use in an electronic device, such as electronic device 100. In some embodiments, a cooling fan 200 can be a centrifugal fan designed to drive a volume of air radially outward from the center of the fan. Cooling fan 200 can include a fan housing 202 that can form an exterior surface for the fan, as well as a fan hub 204 at its center. Fan housing 202 can include a top cover arranged at a top side of impeller 206 and a bottom cover approximately parallel to the top cover and arranged at a bottom side of impeller 206. Fan housing 202 can also include side walls for connecting the top cover to the bottom cover. Air inlet 208 can include an opening in a central portion of the top cover for allowing air to enter the cooling fan 200. In various embodiments, a second air inlet opening can also be included in a central portion of the bottom cover. Air outlet 210 can be disposed in one side of cooling fan 200, and can be oriented approximately perpendicularly to air inlet 208. Various alternative air inlet and air outlet arrangements may also be used.

An impeller assembly including impeller 206 and hub 204 can be disposed within fan housing 202 and can rotate relative to fan housing 202 about an axis of a bearing located within hub 204. This can be a rotational axis, for example. Impeller 206 can include a plurality of fan blades extending radially and outwardly from an outer periphery of impeller 206. The fan blades can be shaped to draw air in through air inlet 208 and out through air outlet 210 when the impeller assembly is rotated. The impeller assembly can also include a magnet and stator within hub 204 that can interact to produce a torque on the impeller assembly, causing the impeller assembly to rotate during operation of cooling fan 200. In some cases, the air received through the air inlet 208 is heated air generated by one or more components of an electronic device, such as electronic device 100 above.

Figure 2B:
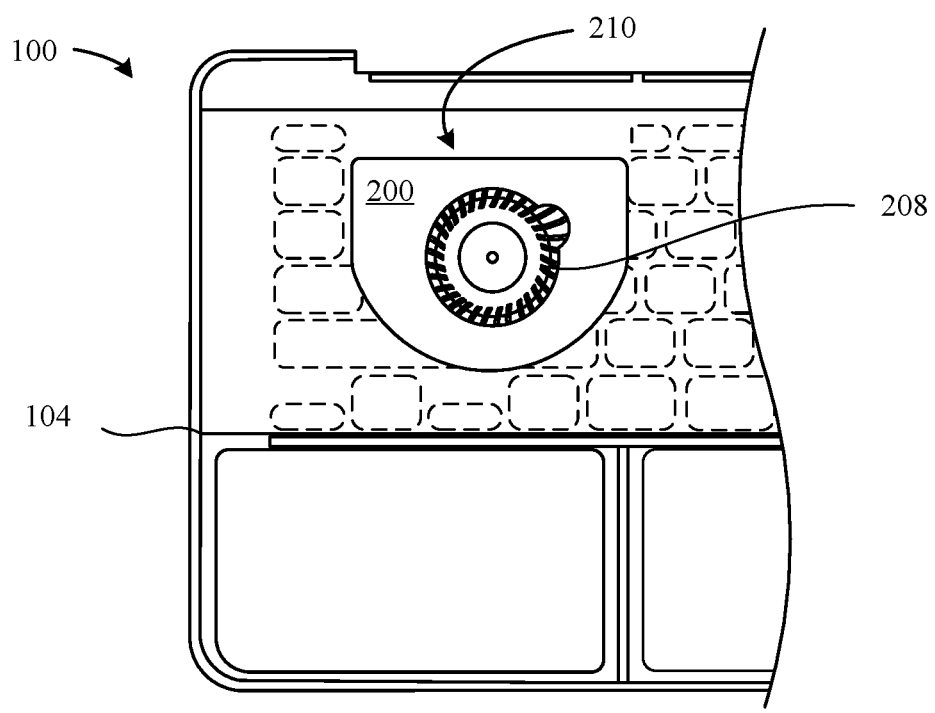
FIG. 2B illustrates in partial bottom plan view the exemplary cooling fan of FIG. 2A disposed within the exemplary electronic device of FIG. 1.

FIG. 2B illustrates in partial bottom plan view the exemplary cooling fan of FIG. 2A disposed within the exemplary electronic device of FIG. 1. Cooling fan 200 can be disposed within the base portion 104 of electronic device 100, and as shown the bottom case of electronic device 100 can be removed to show detail. The air outlet 210 of the cooling fan 200 may be positioned near a vent or opening (not shown) of the base portion 104. In this manner, heated air from internal components (not shown) in the base portion 104 can enter the air inlet 208 of the cooling fan 200 and exit at the air outlet 210 to the vent or opening of the electronic device 100, thereby exiting the electronic device 100. Of course, alternative locations and arrangements for cooling fan 200 within an electronic device 100 are also possible.

Figure 3:
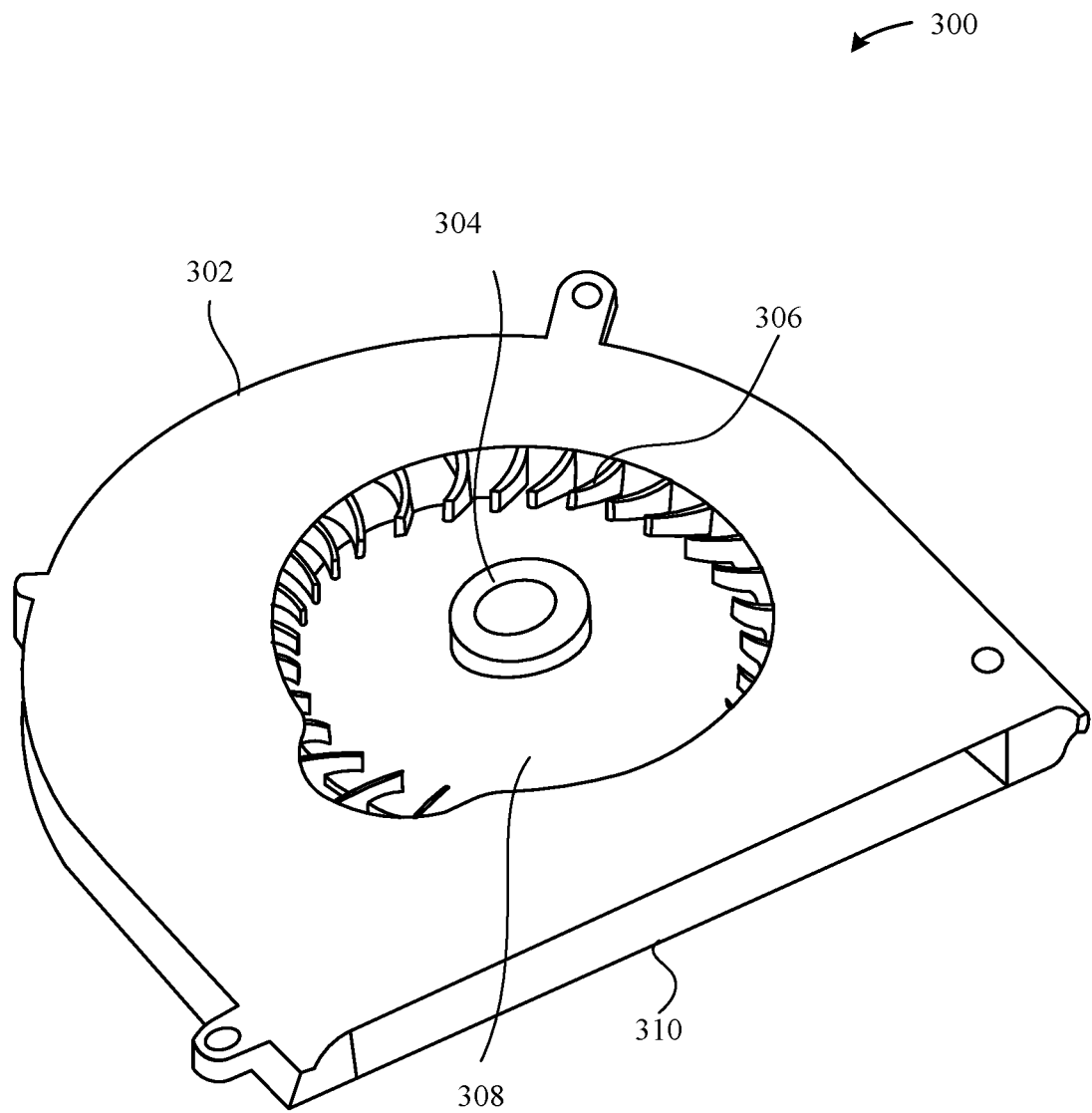
FIG. 3 illustrates in front perspective view an exemplary peripheral drive centrifugal fan suitable for use in the exemplary electronic device of FIG. 1 according to various embodiments of the present disclosure.

Moving next to FIG. 3, an exemplary peripheral drive centrifugal fan according to various embodiments of the present disclosure is shown in front perspective view. Peripheral drive centrifugal fan 300 can also be configured for use with various electronic devices, such as electronic device 100 above, for example. Similar to cooling fan 200 in the example above, peripheral drive centrifugal fan 300 can also include a fan housing 302 that can form an exterior surface for the fan, as well as a fan hub 304 at its center. Fan housing 302 can include a top cover arranged at a top side of impeller 306 and a bottom cover approximately parallel to the top cover and arranged at a bottom side of impeller 306. Fan housing 302 can also include side walls for connecting the top cover to the bottom cover, an air inlet 308 having an opening in a central portion of the top cover, and an air outlet 310 that can be oriented approximately perpendicularly to air inlet 308. Various additional and/or alternative air inlet and air outlet arrangements may also be used, which may result in the fan being classified as an axial fan or other type of fan in some cases. An impeller assembly including impeller 306 and hub 304 can be disposed within fan housing 302 and can rotate relative to fan housing 302 about a rotational axis through the center of hub 304. Impeller 306 can include a plurality of fan blades extending radially and outwardly from an outer periphery of impeller 306, the fan blades shaped to draw air in through air inlet 308 and out through air outlet 310 when the impeller assembly is rotated.

Compared to cooling fan 200 in the example above, peripheral drive centrifugal fan 300 can have a significantly smaller hub 304, as it houses the bearing but not, for example, a magnet and stator. This results in less obstruction of the inlet 308 by the hub, which can result in a greater volume of air or other fluid that can be drawn into air inlet 308 during operation of the fan. Hub 304 can be significantly smaller due to an arrangement whereby the fan motor, magnets, and other driving components are not located within the hub 304. As such, the design of peripheral drive centrifugal fan 300 can involve the magnets and driving components being located on and about the periphery of the impeller 306, such that more space for air flow is created at and about the hub 304. This can involve items being located on and in close proximity to the external portions of the impeller blades, as set forth in greater detail below.

Figure 4A:
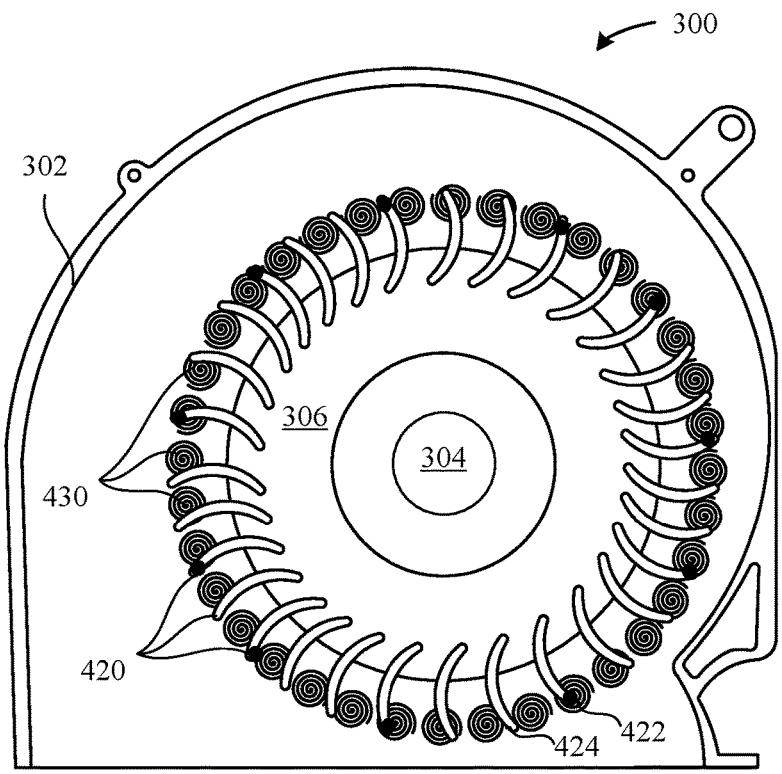
FIGS. 4A-4B illustrate in partial top plan and side perspective views respectively an exemplary impeller blade and inductor group arrangement within a peripheral drive centrifugal fan according to various embodiments of the present disclosure.
Figure 4B:
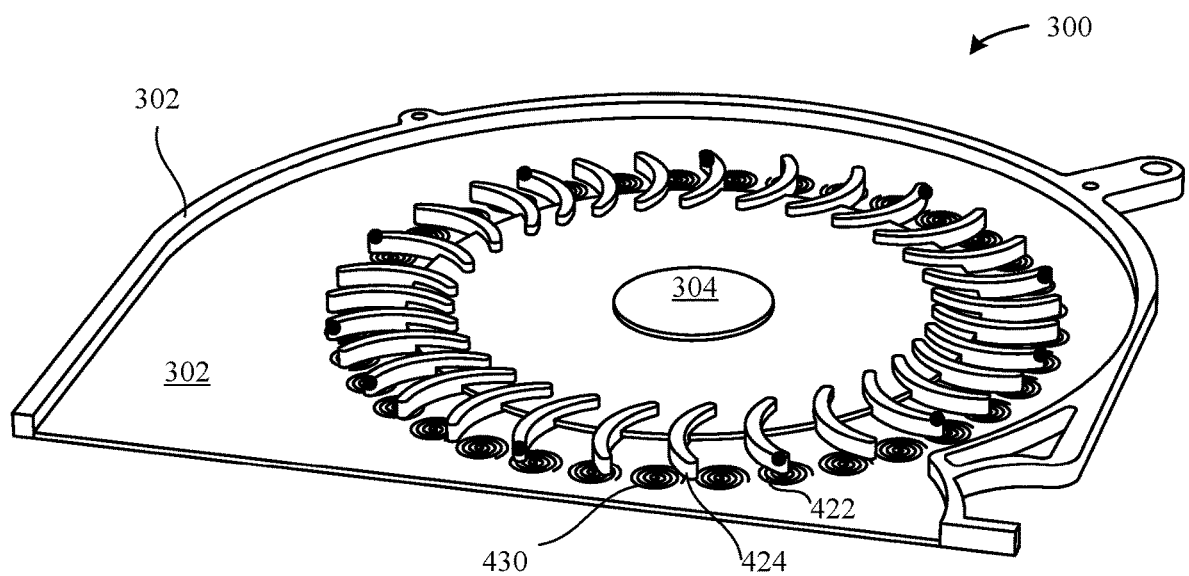

Continuing with FIGS. 4A-4B, an exemplary impeller blade and inductor group arrangement within a peripheral drive centrifugal fan is illustrated in partial top plan and side perspective views respectively. Peripheral drive centrifugal fan 300 can again include a fan housing 302, although the top cover thereof has been removed in FIGS. 4A and 4B for purposes of illustration and discussion. A plurality of impeller blades 420 can be distributed about the relatively smaller fan hub 304. In various embodiments, a subset of the plurality of impeller blades 420 can contain permanent magnets or magnetizable material. Accordingly, impeller 306 can include a plurality of magnetic blades 422 and a plurality of non-magnetic blades 424, which can be arranged in a pattern that can be symmetrical or asymmetrical, as may be desired. As shown here, magnetic blades 422 are designated by a black dot, while non-magnetic blades 424 have no such designation. In some embodiments, impeller 306 can include about thirty (30) blades 420, of which about twelve (12) can be magnetic blades 422 and about eighteen (18) can be non-magnetic blades 424. Other amounts of each type and total number of blades may also be used for a given impeller. For example, every impeller blade may be magnetic in some embodiments, such that no blades are non-magnetic. Of course, each of impeller blades 420 rotates about the center of the impeller 306 during operation of the impeller.

In addition to magnetic blades 422, a plurality of inductor groups 430 can also be radially disposed about the impeller 306. Inductor groups 430 can be stationary in some embodiments, and can be strategically located about the impeller 306 so as to drive the magnetic blades 422 when the inductor groups 430 are energized in a collective manner. In various embodiments, inductor groups 430 can be located at or near an outer circumference of impeller 306, and are preferably located in close proximity to the magnetic portion of magnetic blades 422, such that they may interact to develop torque for rotating the impeller 306. Inductor groups 430 can be located at one or more surfaces of the fan housing 302, such as at an inner bottom surface of the fan housing 302 below the impeller 306 and/or at an inner top surface of the fan housing 302 (not shown) above the impeller 306. As shown, each of inductor groups 430, or at least portions thereof, are located at an inner bottom surface of the fan housing 302, although it will be readily appreciated that similar inductor groups, or portions thereof, can be located on the removed top cover. In some embodiments, there can be about thirty-six (36) inductor groups 430 that are radially disposed in a spaced apart pattern that can be symmetric or asymmetric. Other amounts of inductors and/or spaced apart patterns can also be used, as will be readily appreciated.

One or more of inductor groups 430 can include inductive elements that are printed. For example, a given inductor group 430, or at least a portion thereof, can include a printed coil that is formed on a printed circuit board ("PCB"). In various embodiments, many or all of inductor groups 430 can comprise such printed coils. In such embodiments, one or more thin PCBs containing coils forming inductor groups 430 can be placed against an inner surface of the fan housing 302, such as a bottom inner surface. Accordingly, inductor groups 430 can all comprise flat printed coils that can be located in close proximity to the undersides of the blades forming impeller 306. Because the proximity of the inductor groups 430 to the magnetic portions of magnetic blades 422 can be made very close, the resultant power or current needed to drive the inductor groups 430 can be reduced. Again, another set of inductor groups and printed coils, or at least a portion thereof, can be located above the blades forming impeller 306, such as at one or more thin PCBs placed against an opposing inner surface of the fan housing 302, such as at a top or cover inner surface (not shown). In such instances, it may be preferable to include further magnetic components on the magnetic blades 422, such that magnetic components can be located at the top and bottom of each magnetic blade. In various embodiments, a given inductor group can include one portion at a bottom inner surface of the housing and another portion at a top inner surface of the housing.

In various embodiments, one or more of inductor groups 430 can be a stacked inductor group, such that multiple inductive elements are included for a single inductor group 430. As will be readily appreciated, a single PCB can allow for the formation of multiple coils atop or beneath each other at various PCB layers in a stacked fashion. As such, one, some or all of inductor groups 430 can comprise multiple printed coils or other inductive elements at a single location. These multiple coils can be disposed directly above and below each other, or may be offset from each other, such as in a partially overlapping manner. In some embodiments, this can involve first and second coils for a given inductor group 430. In some embodiments, this can also involve third coils, or a dozen or more coils for a given inductor group 430. Where an inductor group 430 is formed from a stacked number of printed coils, such a stacked inductor group can be selectively energized at each printed coil or pair of printed coils in a manner that is independent with respect to every other printed coil or pair of printed coils in the inductor group 430. Accordingly, an inductor group 430 that forms a stacked group of coils or other inductive elements can have its multiple coils energized in a selective and independent manner so as to control the impeller more efficiently. Each inductor group 430 can be a stacked inductor group similar to that which is shown for stacked inductor group 730 set forth in greater detail below.

As shown and noted above, the inductor groups 430 and the magnetic portions of magnetic blades 422 can be located at or near an outer circumference or periphery of impeller 306. Such locations can provide for more space for these components and for the overall fan assembly in general. This can allow for a greater number of smaller components to be used, as opposed to a lesser number of larger components, which results in the fan being driven by a greater number of smaller forces rather than a lesser number of larger forces. This can also result advantageously in a reduction of torque ripple and associated vibration. Another advantage that can be realized by such an arrangement is that the inductor groups 430 are located within or at least closer to the forced airflow of the fan. By locating the inductor groups 430 proximate to the outer periphery of the fan blades 422, 424, rather than beneath the fan hub or other restricted location, these inductor groups can be better cooled by the fan airflow. The inductor groups 430, and thus any coils, wires, or other similar components therein, can be cooled to a relatively lower temperature by the airflow thereby, which keeps the associated resistance lower and thus results in improved overall fan efficiencies.

Figure 5:
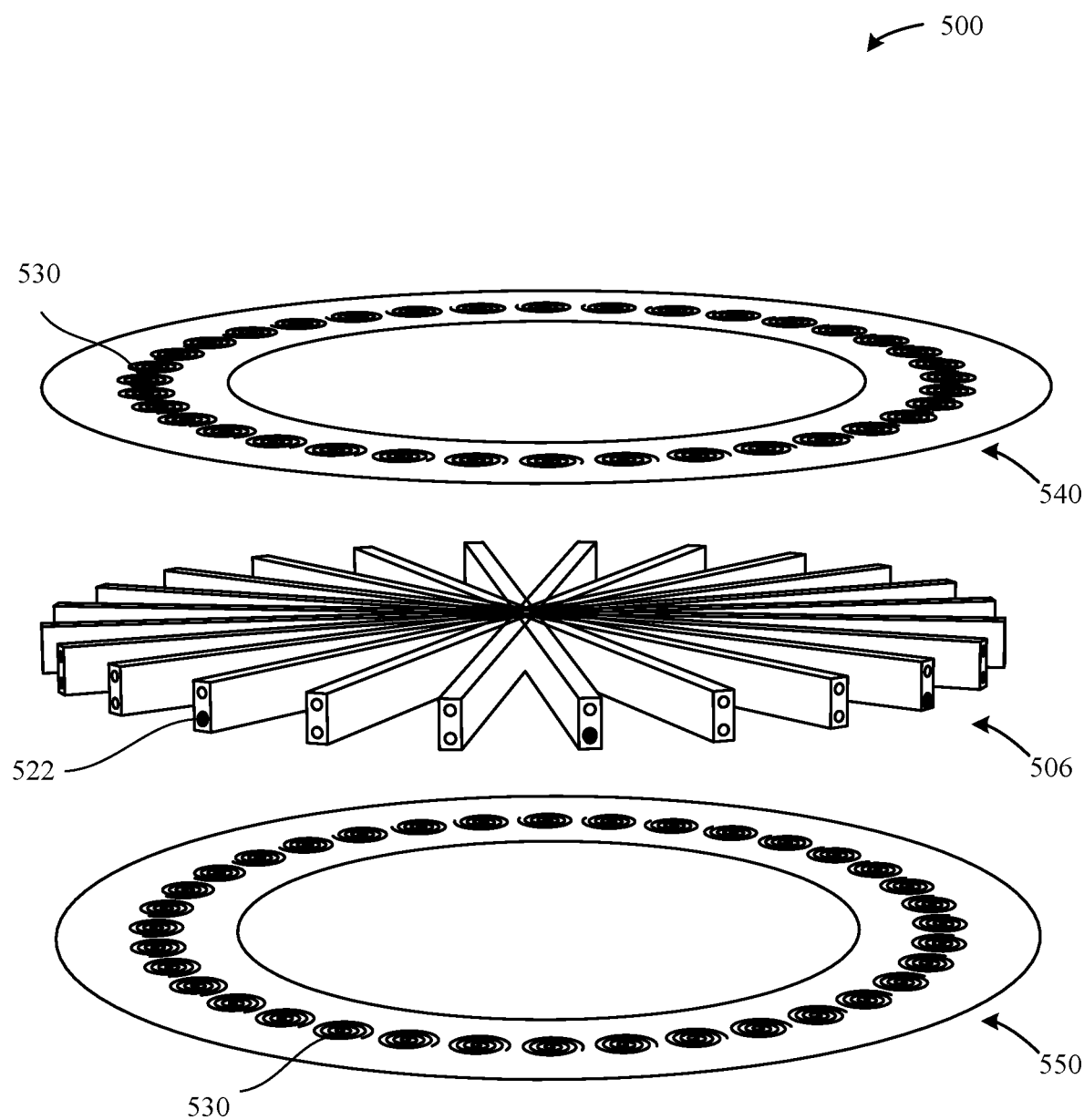
FIG. 5 illustrates in exploded side perspective view an exemplary impeller blade and inductor group arrangement for a peripheral drive centrifugal fan according to various embodiments of the present disclosure.

FIG. 5 illustrates in exploded side perspective view an exemplary impeller blade and inductor group arrangement for a peripheral drive centrifugal fan according to various embodiments of the present disclosure. Arrangement 500 can include an impeller 506 having a plurality of magnetic blades 522 and a plurality of inductor groups 530 that are organized into an upper inductor level 540 above the impeller 506 and/or a lower inductor level 550 below the impeller 506. Upper inductor level 540 can be located at, for example, an upper surface of a fan housing, while lower inductor level 550 can be located at, for example, a lower surface of a fan housing. Note that the sizes and design of impeller 506 can vary. For example, a hub of impeller 506 can be of reduced size in accordance with some embodiments. Also, blades 522 need not extend to the center of the impeller in some embodiments. Further, impeller 506 can have blades 420 in some embodiments. Each inductor group 530 at each level 540, 550 can represent a stacked inductor group having a plurality of printed coils in stacked fashion thereat. Again, each inductor group 530 can be a stacked inductor group similar to that which is shown for stacked inductor group 730 below. Similar to the foregoing examples, there can be about 12 magnetic blades 522 on impeller 506, and about 36 inductor groups 530 at each inductor level 540, 550. The magnetic blades 522 can be spaced apart in a pattern that is symmetric or asymmetric, and the inductor groups 530 at each of upper inductor level 540 and the lower inductor level 550 can also be spaced apart in a pattern that is symmetric or asymmetric. Of course, different numbers and patterns of blades and inductors can also be used.

Each of magnetic blades 522 can be formed in any number of ways. In various embodiments, a magnetic blade 522 can be formed by attaching or otherwise coupling a magnet to a non-magnetic blade. This can be done at or about the distal end of the blade, for example. In various embodiments, the entire magnetic blade itself can be formed from a magnet, such as a magnetized steel or other magnetic material. In still other embodiments, a ferrous powder, neodymium iron boron powder, or other suitable material, can be mixed into a plastic resin during formation of a plastic impeller having blades that can be magnetized. Other ways of forming blades that are magnetic or at least have a magnetically active portion are also possible, and it is specifically contemplated that all such blades can be used with the various embodiments of the present disclosure.

Figure 6:
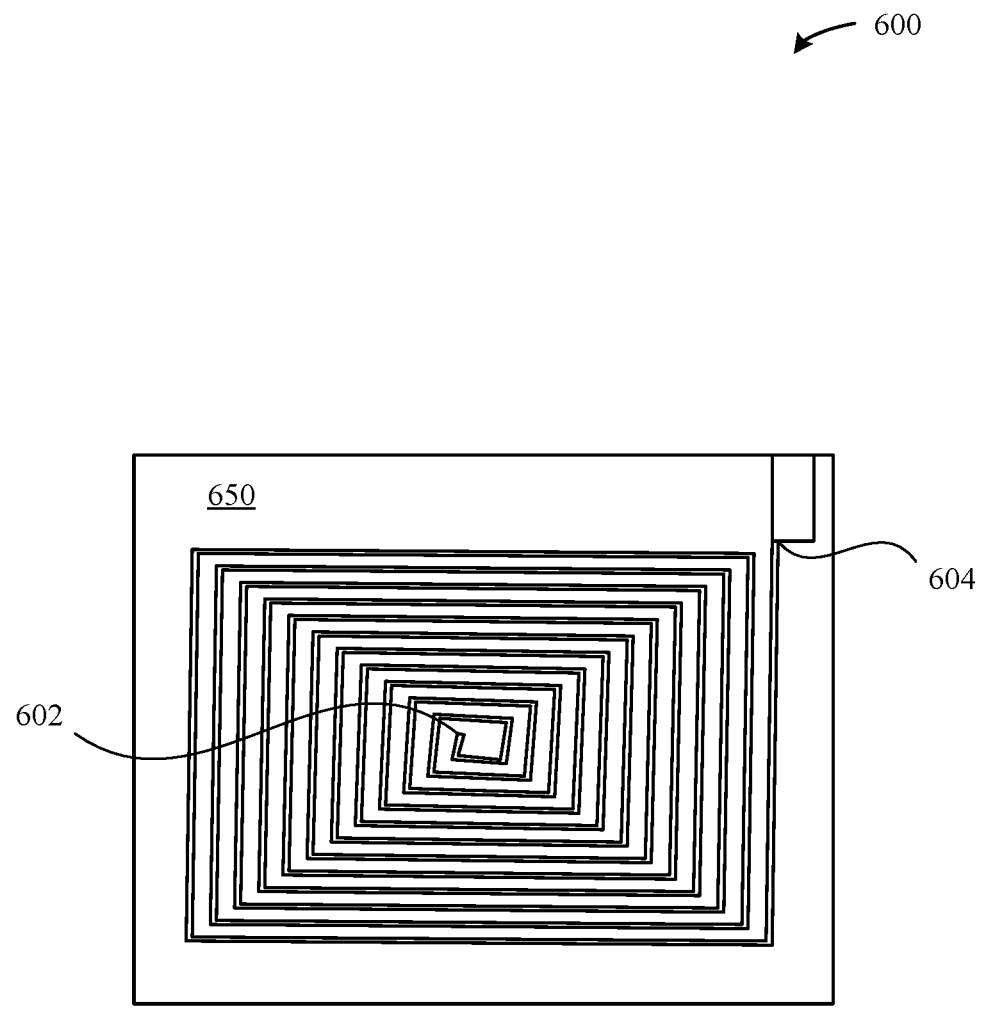
FIG. 6 illustrates in top plan view an exemplary printed inductor coil for use within a peripheral drive centrifugal fan according to various embodiments of the present disclosure.

FIG. 6 illustrates in top plan view an exemplary printed inductor coil for use within a peripheral drive centrifugal fan according to various embodiments of the present disclosure. Printed inductor coil 600 can comprise a metal wire or conductive trace formed on a PCB 650, such as a copper trace, for example. Although shown as rectangular, printed inductor coil 600 can be circular, rectangular, trapezoidal, or any other suitable shape, such as to maximize surface area as may be desired. Printed inductor coil 600 can facilitate the use of low profile stators, which are inexpensive and easy to manufacture. Unlike traditionally wire-wound stators, there are no windings, stampings, or laminating of stator steel. Printed coils are effectively potted, which can reduce or eliminate startup noises such as chirps or beeps. Printed inductor coil 600 can be formed on a thin polyimide film, for example, and can provide a high inductance in a relatively small amount of space. The absence of steel between the coils and the permanent magnets can also have the added benefit of reducing or eliminating cogging torque, which is typically a significant cause of motor noise and vibration.

The center 602 of the printed inductor coil 600 can form an inlet for current while the exterior edge 604 forms an outlet for current, or vice-versa, as will be readily appreciated. When a suitable level of current is applied through the printed inductor coil 600, a corresponding magnetic field extending from the coil will then result. This magnetic field can have a positive polarity or negative polarity, depending upon the amount and direction of current applied through the printed inductor coil 600. The amplitude of the magnetic field will also correspond to the amount of current applied through the printed inductor coil 600, as will be readily appreciated. The amounts, polarity, and timing of currents passed through a given printed inductor coil 600 can be controlled through circuitry and a controller associated with the inductor and fan operations. Again, a plurality of printed inductor coils 600 can be formed for each stacked inductor group in a peripheral drive centrifugal fan.

Figure 7:
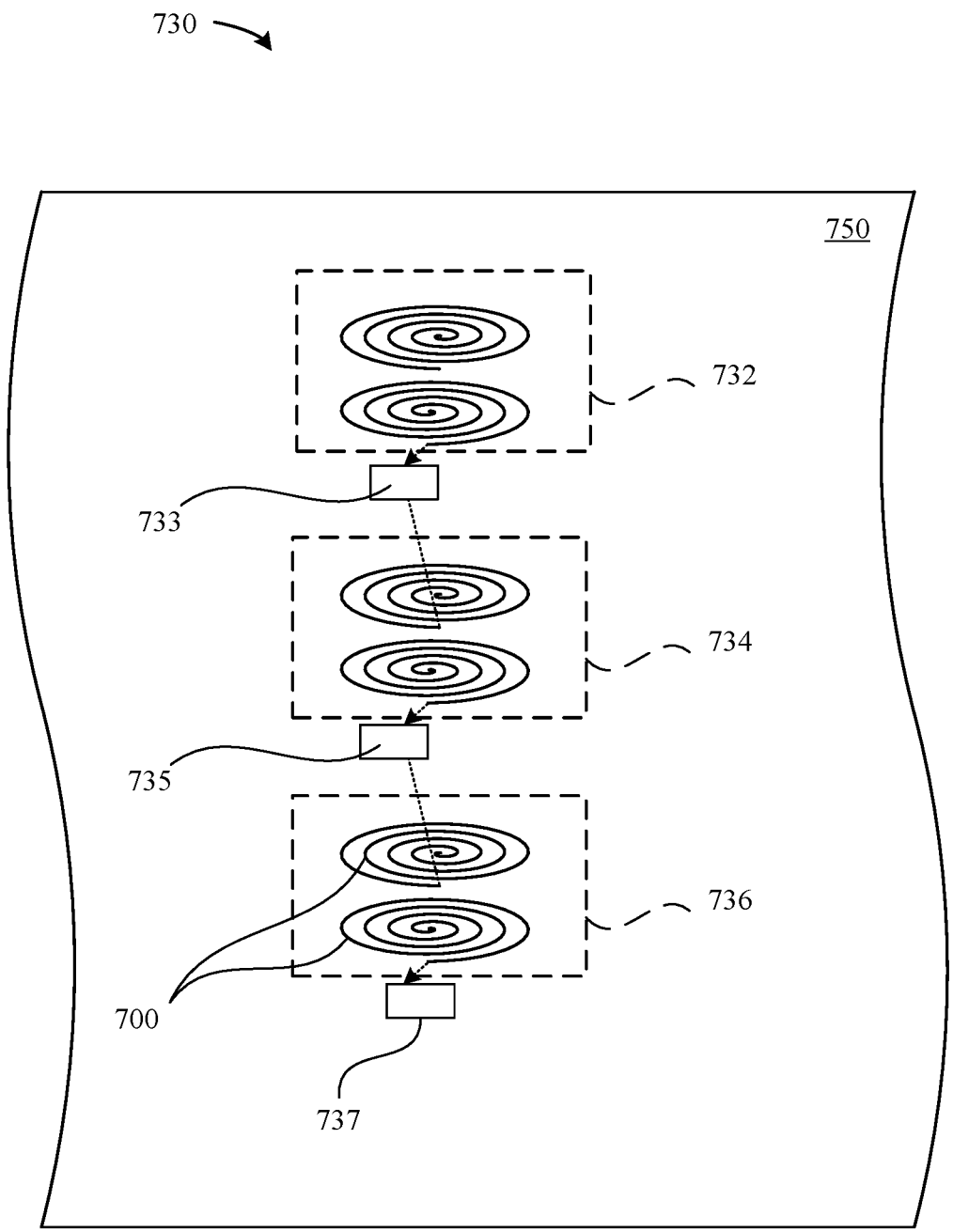
FIG. 7 illustrates in exploded side perspective view an exemplary single stacked inductor group having a plurality of printed coils for use within a peripheral drive centrifugal fan according to various embodiments of the present disclosure.

FIG. 7 illustrates in exploded side perspective view an exemplary single stacked inductor group having a plurality of printed coils for use within a peripheral drive centrifugal fan according to various embodiments of the present disclosure. Stacked inductor group 730 can include three pairs of printed inductor coils 700, although fewer or more pairs of inductor coils can be included for a given stacked inductor group. A first printed inductor coil pair 732 can be located at or near an upper surface of PCB 750, a second printed inductor coil pair 734 can be located directly beneath the first printed inductor coil pair 732, and a third printed inductor coil pair 736 can be located directly beneath the second printed inductor coil pair 734, all on the same PCB 750. Each of printed inductor coil pairs 732, 734, 736 can be coupled, for example, by way of a via through the center of each printed inductor coil 700. In various embodiments, one coil from a coil pair can be wound from the outside to the center, while the other coil from a coil pair can be wound from the center to the outside. Other arrangements for a stacked inductor group 730 are also possible, by using fewer or more coils per paired or grouped unit, as well as fewer or more grouped units of inductor coils per stacked inductor. Furthermore, individual inductor coils need not be located directly above or below each other. In fact, it will be understood that a "stacked inductor group" can simply refer to a plurality of inductor coils that are located in close proximity to each other, such as in an overlapping but not identically stacked arrangement.

Each of printed inductor coil pairs 732, 734, 736 within stacked inductor group 730 can be independently and selectively energized, such that magnetic impeller blades (not shown) travelling above stacked inductor group 730 are attracted or repelled according to the inductor group coils that are actually energized. Selective energizing of each inductor coil pair 732, 734, 736 can be by way of a respective switch 733, 735, 737, which switch can be for example, a field effect transistor, among other suitable electrically controllable switches. Switch 733 can control the selective energization of printed inductor coil pair 732, while switch 735 can control the selective energization of printed inductor coil pair 734, and switch 737 can control the selective energization of printed inductor coil pair 736. Selective energizing can result in, for example, full powering of the impeller when all coil pairs are energized, or reduced powering of the impeller when only some of the coil pairs are energized. Selective energizing can also result in reversing polarity effects when timed properly, which can be used to reduce speed or brake the existing rotation of the impeller. Each printed inductor coil pair 732, 734, 736 and associated switch 733, 735, 737 can be coupled in parallel or in series to the other printed inductor coil pairs, and each can be selectively energized with or without the energization of one or more of the other coil pairs, with varying power and polarity effects being realized depending upon which inductor coil pairs are selectively energized at a given time.

Figure 8:
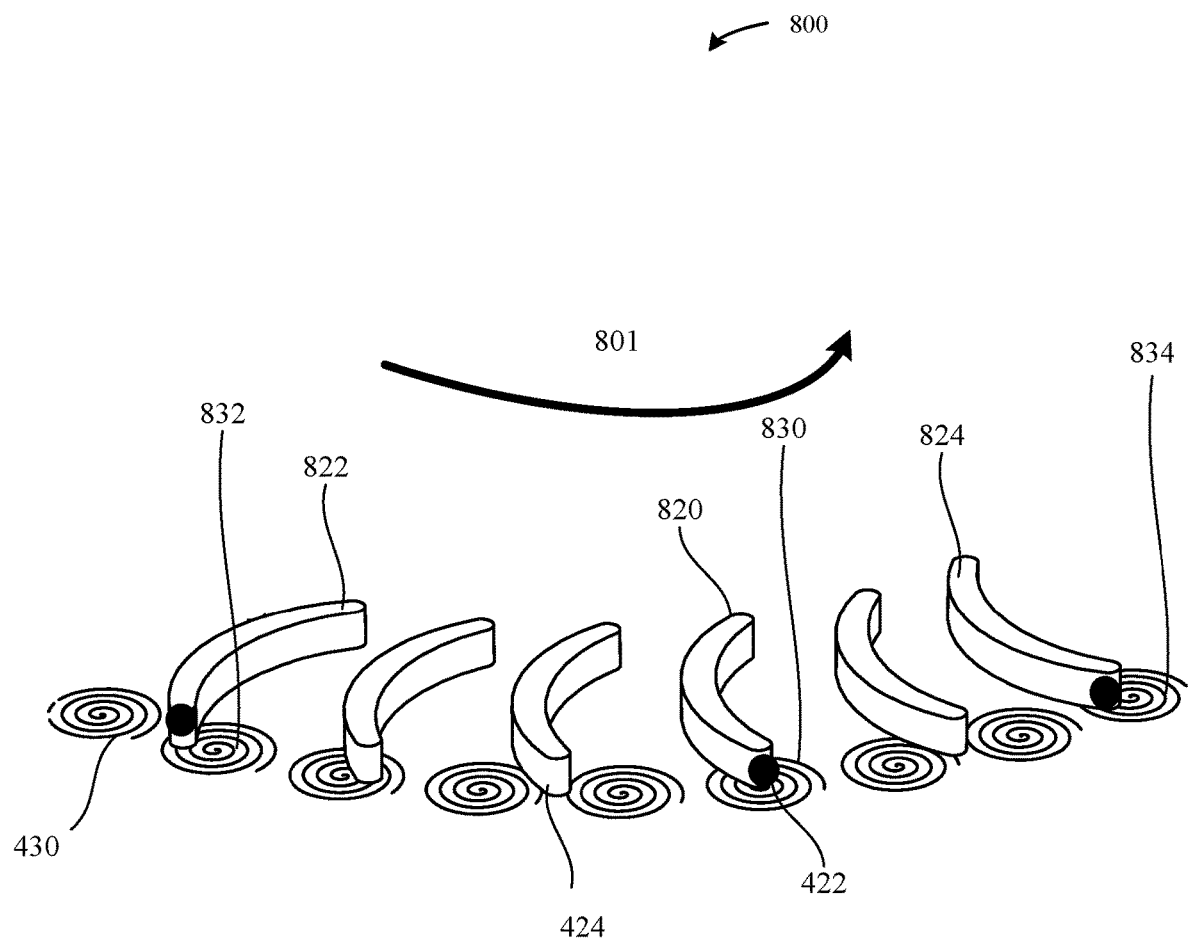
FIG. 8 illustrates in front perspective view an exemplary impeller portion having multiple magnetized blades and corresponding inductor groups for use within a peripheral drive centrifugal fan according to various embodiments of the present disclosure.

FIG. 8 illustrates in front perspective view an exemplary impeller portion having multiple magnetized blades and corresponding inductor groups for use within a peripheral drive centrifugal fan according to various embodiments of the present disclosure. Impeller portion 800 can be similar to a portion of the impeller depicted in FIG. 4B, for example. Accordingly, impeller portion 800 can include a plurality of magnetic blades 422 and a plurality of non-magnetic blades 424, all of which rotate in proximity to a plurality of inductor groups 430, such as along general rotational direction 801. Again, one or more of inductor groups 430 can comprise a stacked inductor group having multiple printed inductor coils in a stacked arrangement, such as that which is set forth for stacked inductor group 730.

As shown in FIG. 8, a given or "middle" magnetic blade 820 can be directly aligned with a given or "first" inductor group 830 at a particular time. At such a time of direct alignment, the first inductor group 830 can be turned off or otherwise provide no magnetic field or force to magnetic blade 820. At this same time, neither of a "trailing" magnetic blade 822 that is the next magnetic blade behind middle magnetic blade 820 in the direction of rotation 801, nor a "leading" magnetic blade 824 that is the next magnetic blade ahead of middle magnetic blade 820 in the direction of rotation 801, is directly aligned with any inductor group. That is, there can be a slight offset between trailing magnetic blade 822 and a second inductor group 832 that is closest thereto, and also a slight offset between leading magnetic blade 824 and a third inductor group 834 that is closest thereto when the middle magnetic blade 820 is directly aligned with first inductor group 830. The relative spacing pattern between all of the magnetic blades 422 and the relative spacing pattern between all of the inductor groups 430 can be designed such that these types of offsets between at least some magnetic blades and inductor groups always exist at some location(s), in order to provide the ability to drive an impeller containing the blades regardless of any impeller position relative to the inductor groups 430.

In the offsets shown in FIG. 8, multiple coils within second inductor group 832 can be selectively and independently energized at the depicted position such that they form collectively a variable magnetic field that attracts the magnetically active portion of the trailing magnetic blade 822. Due to the offset between the second inductor group 832 and the trailing magnetic blade 822, this attraction force drives the trailing magnetic blade 822 in general rotational direction 801. Similar effects and results can be obtained for multiple coils within third inductor group 834 with respect to leading magnetic blade 824. Of course, the various coils within a given inductor group 430 can be selectively energized to attract the closest magnetic blade 422 when that closest magnetic blade 422 is "behind" or approaching the given inductor group 430 along the rotational direction 801, such that the inductor group 430 "pulls" the closest magnetic blade 422 in the rotational direction 801. In the event that the closest magnetic blade 422 to a given inductor group 430 is "ahead of" or beyond (not shown) the given inductor group 430 along the rotational direction 801, then the various coils within that given inductor group 430 can be selectively energized to repel the closest magnetic blade 422 along the rotational direction 801, such that the inductor group 430 "pushes" the closes magnetic blade 422 in the rotational direction 801. Alternatively, the various coils within a given inductor group 430 having a closest magnetic blade 422 ahead or behind it may not be selectively energized at all in some cases.

In some embodiments, one or more of the non-energized coils within a given inductor group 430 can be used to sense the position and/or speed of one or more of the magnetic blades 422. Such sensing can then be used to convey data or feedback to an overall fan control system, which can in turn use the data or feedback to help fine tune the timing and other dynamic features and characteristics of the fan system. For example, active balancing of one or more other undesirable forces might be achievable by way of sensing the position and/or speed of the various magnetic blades 422.

In some embodiments, one, some, or all of the inductor groups 430 may be selectively energized so as to operate as "push" or "pull" inductor groups only. For example, a given inductor group 430 might be selectively energized only to push the closest magnetic blade 422 thereto. In such embodiments, where blade motion in rotational direction 801 is to be maintained or accelerated, then the given inductor group 430 can be selectively energized only when the closest magnetic blade 422 passes over and moves away from the inductor group 430. In this manner, no energizing or resultant force is provided as the closest magnetic blade 422 approaches the given inductor group 430, and a selective energizing in the form of a repelling force is provided to push the closest magnetic blade 422 after it passes and moves away from the given inductor group 430. In a similar manner, a given inductor group 430 might be selectively energized only to pull the closest magnetic blade 422 thereto as that closest magnetic blade approaches the given inductor group 430.

In some embodiments, one, some, or all of the inductor groups 430 may be selectively energized in a reverse manner to brake or otherwise decelerate the rotational motion 801 of an impeller having magnetic blades 422. Still further, where an impeller velocity in the rotational direction 801 is to be increased, then one or more additional coils within one or more of the inductor groups 430 can be added to the selective energizing of the inductor groups. Alternatively, or in addition, the coils within inductor groups 430 that are already being selectively energized can have the amount of current provided thereto increased, such that the strength of the magnetic field and resulting magnetic forces on the magnetic blades are also increased. In some embodiments, selectively energizing only some of the coils within one or more inductor groups can be one way to provide both a lesser magnetic field and also a lower resistance. Such an approach can be used to increase the maximum speed achievable by the fan impeller while also maintaining a higher torque capability upon startup, such that the required level of starting current can be reduced. In still other embodiments, the rotational direction 801 can be reversed if desired through a reverse selective energizing of coils within the various inductor groups 430.

As will be readily appreciated, selective energization of coils can involve energizing the selected coils in a cycle that corresponds to the rotational speed of the magnetic blades or impeller therefor. That is, each coil that is being selectively energized can be energized according to a cycle of off, on, and/or reversed polarity according to the location of a closest magnetic blade with respect to the respective inductor group where the coil is located. As the closest magnetic blade moves, the selectively energized coil can be provided with a current that results in the closest magnetic blade being pushed or pulled until it passes the respective inductor group.

In some embodiments, a given fan may be driven by using only repelling forces (or alternatively by using only attracting forces in some instances). Such a drive approach could be realized by forcing current in the appropriate single direction through coils, so as to create the proper polarity in a given coil with respect to the existing polarity of a permanent magnet on a nearby impeller blade. Of course, the driving repelling or attracting forces can vary by varying amplitudes or magnitudes of the forced current. By using only repelling forces with inductor groups being located both above and below the impeller blades, the magnetized impeller blades could be "squeezed" to a centerline of rotation between the top and bottom fan covers. This could then result in reduced restrictions on mechanical tolerances for various fan components, and could also result in improved overall aerodynamic efficiencies. The unidirectional current and resulting magnetic flux could also reduce losses associated with magnetic hysteresis and eddy currents. Operational impeller vibrations could also be reduced due to the existence of constant repelling forces rather than alternating repelling and attracting forces.

As noted above, various benefits can be observed by relocating the magnetic drive components outside of an impeller hub for a centrifugal fan. In addition to decreasing the hub size and thus reducing entrance losses and increasing air flow through a fan of the same volume or footprint, a higher number of stator positions can be realized, fractional or asymmetrical magnet, blade, and/or inductor group spacings can be used, motor efficiencies can be improved, and cogging torques and torque ripples can be reduced or even eliminated.

Figure 9:
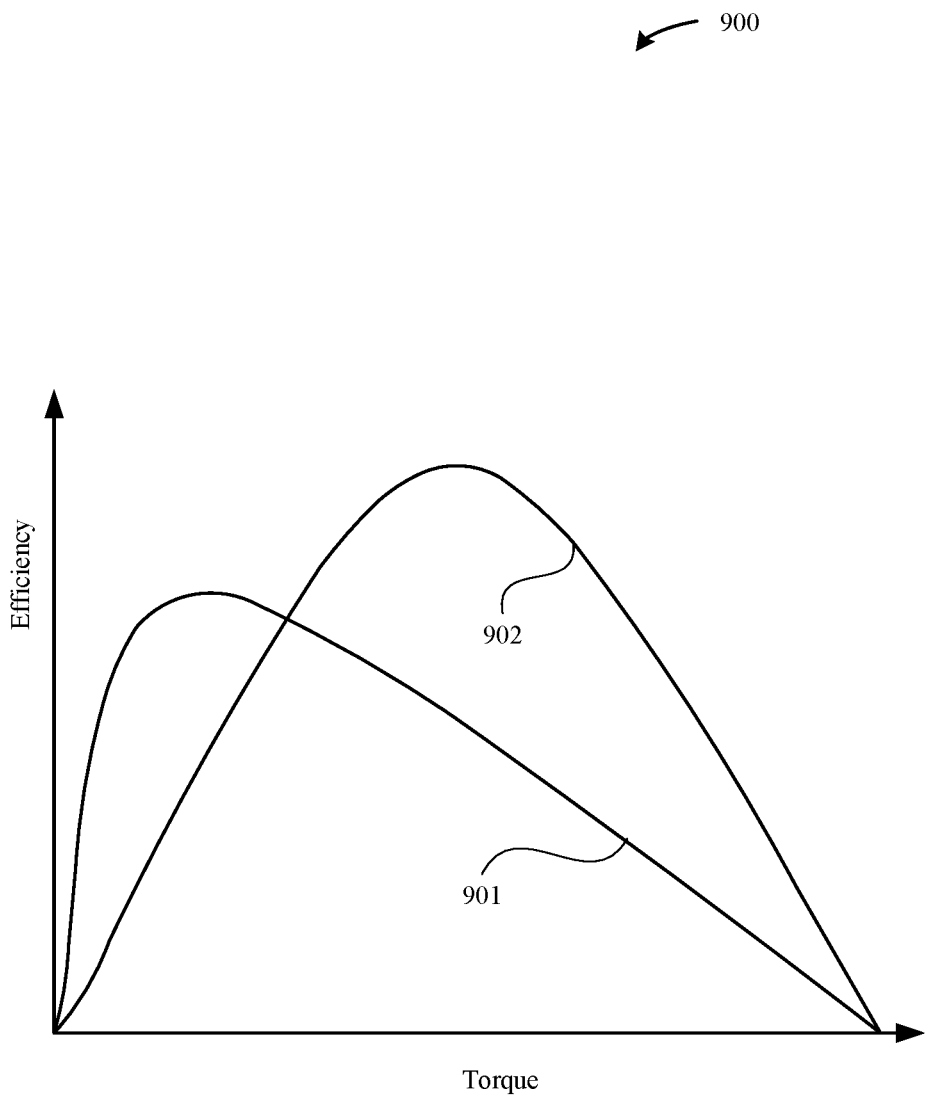
FIG. 9 illustrates a graph of exemplary torque efficiency curves for a peripheral drive centrifugal fan having stacked inductor groups according to various embodiments of the present disclosure.

FIG. 9 illustrates a graph of exemplary torque efficiency curves for a peripheral drive centrifugal fan having stacked inductor groups according to various embodiments of the present disclosure. Graph 900 includes various torque efficiency curves that correspond to a stacked inductor group, such as stacked inductor group 730 set forth above. Graph 900 depicts torque along its horizontal axis against efficiency along its vertical axis. By allowing the selective and independent energization of each printed inductor coil or inductor coil pair 732, 734, 736, such as by way of independent switches 733, 735, 737, a given stacked inductor group 730 can be reconfigured dynamically during operation. As such, a plurality of various efficiency curves can be provided for stacked inductor group 730, and each different efficiency curve can be toggled to or away from as desired, depending upon the selective energization of the various inductor coils within the stacked inductor group 730. Curve 901 can represent, for example, a torque efficiency curve for only one set of inductor coils being selectively energized at each stacked inductor group. Curve 902 can represent, for example, a torque efficiency curve for two sets of inductor coils being selectively energized at each stacked inductor group. Other curves can also be realized for additional numbers of inductor coils that are selectively energized at each stacked inductor group. Still further curves can also be realized where the amount of current is lower or higher for the same number of inductor coils being selectively energized, as will be readily appreciated.

Figure 10:
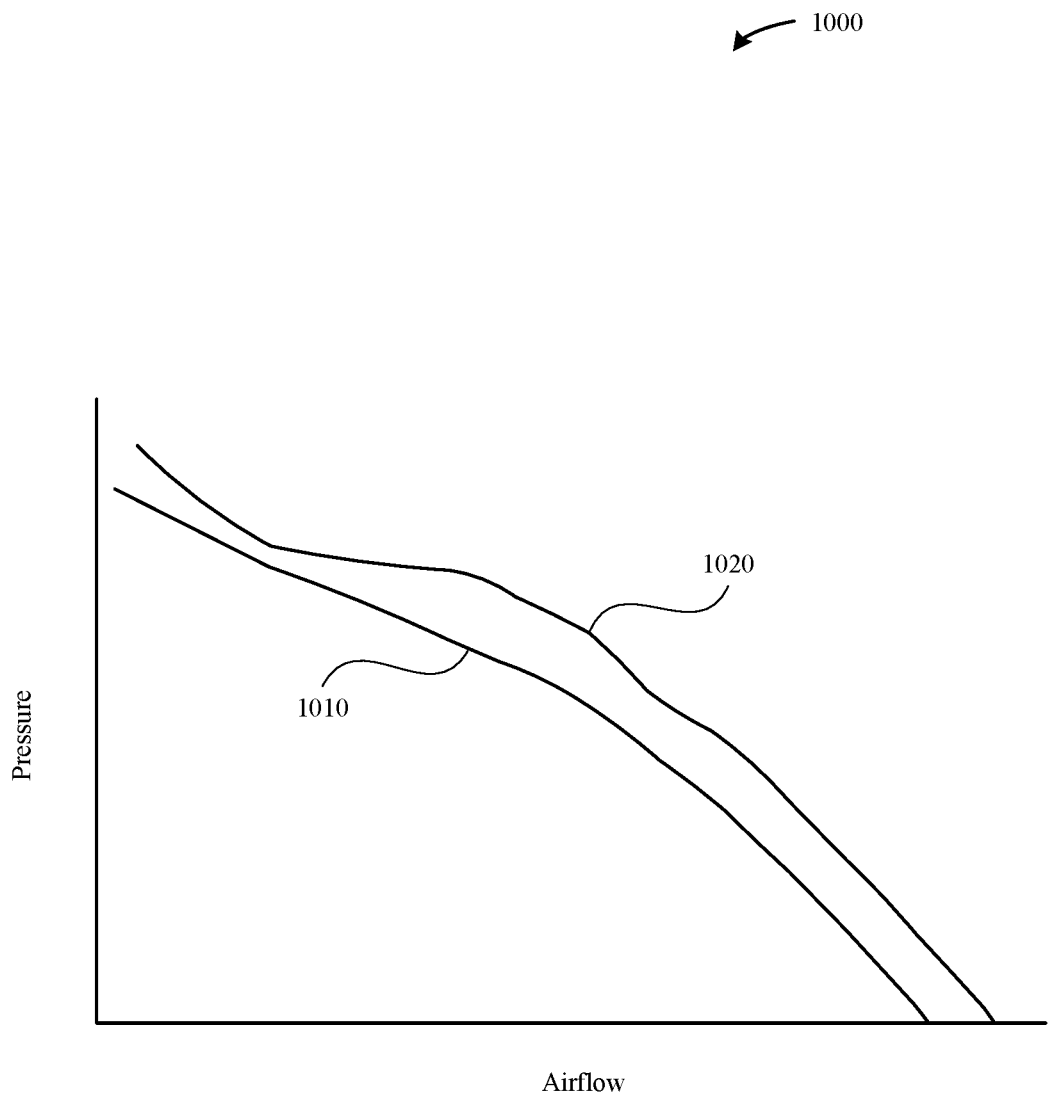
FIG. 10 illustrates a graph of exemplary fan curves for centrifugal fans having differing hub sizes according to various embodiments of the present disclosure.

FIG. 10 illustrates a graph of exemplary fan curves for centrifugal fans having differing hub sizes according to various embodiments of the present disclosure. Graph 1000 depicts air flow along its horizontal axis against static pressure along its vertical axis. Curve 1010 represents air flow versus static pressure for a centrifugal fan having a hub with a diameter of about 20 mm, while curve 1020 represents air flow versus static pressure for a reduced size hub or hub-less centrifugal fan having substantially similar dimensions with the exception of the hub. Curve 1010 can generally represent the approximate air flow for some embodiments, such as cooling fan 200 described with reference to FIG. 2A. Curve 1020 can generally represent the approximate air flow for some embodiments, such as the peripheral drive centrifugal fan 300 described with reference to FIG. 3. As shown in graph 1000, a significant increase in air flow through a centrifugal fan can be observed by reducing or eliminating the size of the hub at the center of the fan.

Figure 11:
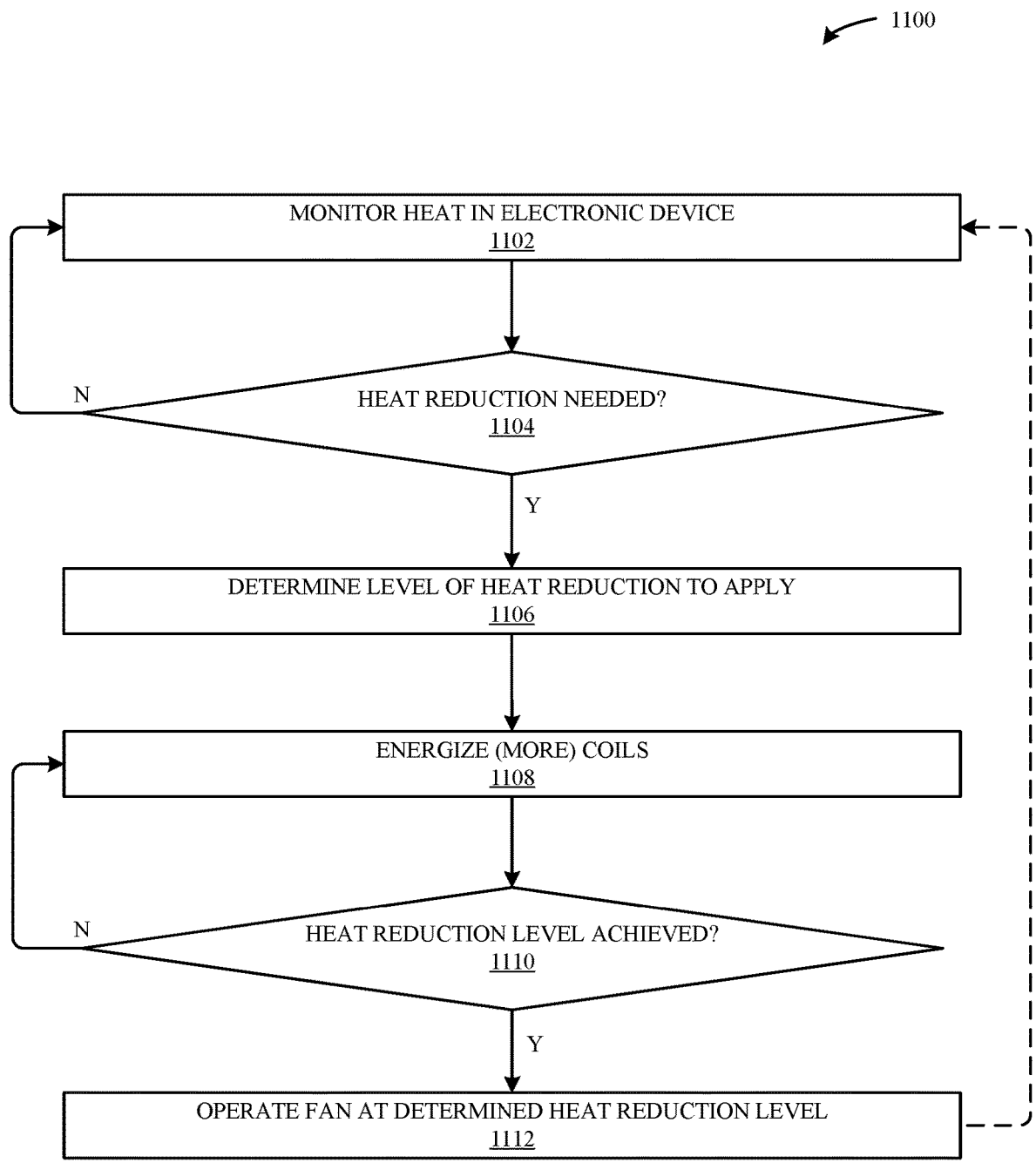
FIG. 11 illustrates a flowchart of an exemplary method performed by a processor of managing heat for an electronic device according to various embodiments of the present disclosure.

FIG. 11 illustrates a flowchart of an exemplary method performed by a processor to manage heat for an electronic device according to various embodiments of the present disclosure. Method 1100 can be carried out by a processor or other controller that may be located on the electronic device for which heat is to be managed, for example. Further, a fan to be controlled by the processor or other controller may also be located on the subject electronic device. At block 1102, heat is monitored in the electronic device. This can be the result of a sensor or other component measuring the heat. Such measures and/or other commands can be reported to the processor or other controller where fan operation is managed, such that heat monitoring can take place.

At a decision block 1104, an inquiry is made as to whether a heat reduction is needed in the electronic device. If not, then the method reverts to block 1102 where heat is monitored. If it is detected that a heat reduction is needed in the electronic device at decision block 1104, however, then the method continues to process block 1106, where a level of heat reduction to apply is determined. In various embodiments, two or more different levels of heat reduction may be available, such as where different numbers of coils can be energized and/or different amounts of current can be applied to the coils that are energized. Many levels of heat reduction can be available in some embodiments.

At a subsequent block 1108, coils in each of multiple stacked inductor groups are energized such that an amount of heat reduction is increased. At a decision step 1110, an inquiry is then made as to whether the determined heat reduction level has been achieved. If not, then the method reverts back to process step 1108, where more coils in each of multiple stacked inductor groups are energized. This process can repeat until a sufficient number of coils are energized to achieve the determined heat reduction level. Where the determined heat reduction level is achieved at decision step 1110, then the method continues to process step 1112, where the fan is operated at the determined heat reduction level. The method can then optionally revert back to process step 1102, where heat is then again monitored in the electronic device.

For the foregoing flowchart, it will be readily appreciated that not every step provided is always necessary, and that further steps not set forth herein may also be included. For example, added steps that involve detecting when less heat reduction is needed and de-energizing coils accordingly may be added. Also, steps that provide more detail with respect to cycling the energizing of coils according to a frequency may also be added. Such a cycle can include a positive magnetic force, a negative magnetic force, and no magnetic force emanating from a coil during a given coil energizing cycle. Furthermore, the exact order of steps may be altered as desired, and some steps may be performed simultaneously.

Figure 12:
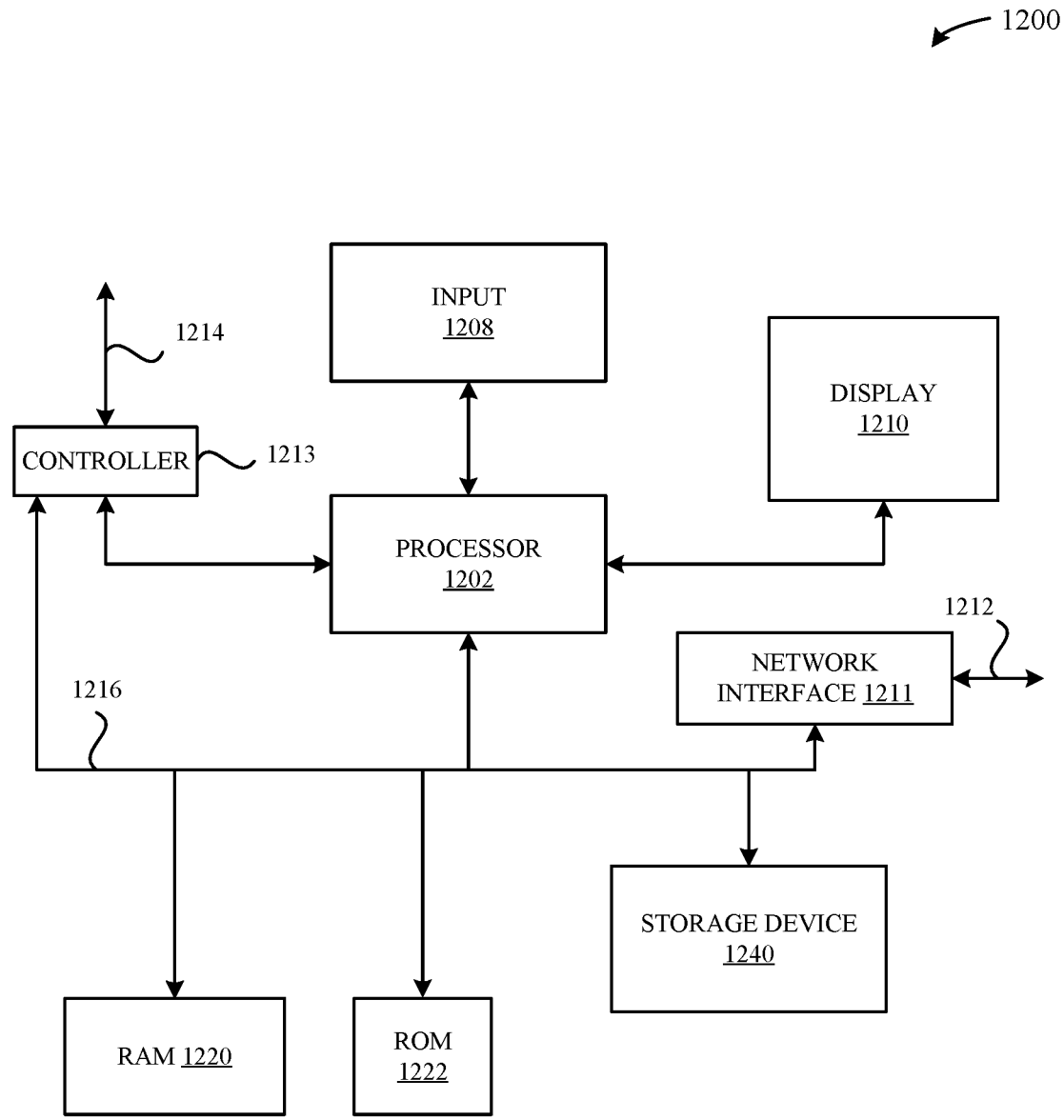
FIG. 12 illustrates in block diagram format an exemplary computing device that can be used to implement the various components and techniques described herein according to various embodiments of the present disclosure.

FIG. 12 illustrates in block diagram format an exemplary computing device 1200 that can be used to implement the various components and techniques described herein, according to some embodiments. For example, the detailed view illustrates various components that can be included in the electronic device 100 illustrated in FIG. 1. Such components can include a peripheral drive centrifugal fan, such as that which is shown in FIG. 3, as well as a processor that controls the fan, such as by way of the method shown in FIG. 11. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, a movie or other AV or media content). A data bus 1216 can facilitate data transfer between at least a storage device 1240, the processor 1202, and a controller 1213. The controller 1213 can be used to interface with and control different equipment through an equipment control bus 1214. Such equipment can include, for example, a peripheral drive centrifugal fan, such as that which is disclosed herein. The computing device 1200 can also include a network/bus interface 1211 that couples to a data link 1212. In the case of a wireless connection, the network/bus interface 1211 can include a wireless transceiver.

The computing device 1200 can also include a storage device 1240, which can comprise a single disk or a plurality of disks (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory (RAM) 1220 and a Read-Only Memory (ROM) 1222. The ROM 1222 can store programs, utilities or processes to be executed in a non-volatile manner. The RAM 1220 can provide volatile data storage, and stores instructions related to the operation of the computing device 1200.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A fan, comprising:
a plurality of blades including first blades having a magnetically active portion and second blades not having a magnetically active portion, wherein the plurality of blades are rotatable about a common axis; and
inductor groups radially disposed about the common axis and proximate the magnetically active portions, at least one of which includes a first coil and a second coil in a stacked arrangement, wherein the first coil and second coil are selectively and independently energizable to form collectively a variable magnetic field that drives a magnetically active portion of a blade about the common axis in a rotational direction about the common axis, wherein predetermined numbers of the second blades are located circumferentially between each pair of circumferentially adjacent blades of the first blades, and the predetermined numbers of the second blades are not all equal.

2. The fan of claim 1, wherein each first coil is printed to a printed circuit board.

3. The fan of claim 2, wherein each second coil is printed to the same printed circuit board as the first coil for each stacked inductor group.

4. The fan of claim 1, wherein at least one inductor group further includes a switch configured to allow a selective use of the first coil and second coil.

5. The fan of claim 4, wherein the switch comprises a field effect transistor.

6. The fan of claim 1, wherein a middle blade having a magnetically active portion is directly aligned with a first inductor group when leading and trailing blades having magnetically active portions nearest the middle blade are not directly aligned with any of the inductor groups.

7. The fan of claim 6, wherein the leading blade is driven along the rotational direction by a second inductor group that repels the leading blade, and the trailing blade is driven along the rotational direction by a third inductor group when the middle blade is directly aligned with the first inductor group.

8. The fan of claim 1, wherein each stacked inductor group further includes a third coil configured to interact with the first coil and the second coil to form collectively the variable magnetic field.

9. The fan of claim 1, further comprising:
a housing arranged to support the plurality of blades and the inductor groups, wherein each first coil is located at a first interior surface of the housing.

10. The fan of claim 9, wherein each second coil is located at a second interior surface of the housing opposite the first interior surface.

11. An electronic device, comprising:
an outer housing arranged to enclose and support a plurality of internal components;
a fan housing located within the outer housing and arranged to enclose and support a plurality of fan components;
an impeller located at least partially within the fan housing and defining an axis of rotation, the impeller including a plurality of blades comprising first blades having a magnetically active portion and second blades not having a magnetically active portion, wherein predetermined numbers of the second blades are located circumferentially between each pair of circumferentially adjacent blades of the first blades, and the predetermined numbers of the second blades are not all equal; and
a plurality of stacked inductor groups radially disposed about the axis of rotation, each of the plurality of stacked inductor groups including a first coil and a second coil, wherein the first coil and second coil are selectively energizable to impart variable magnetic forces to the magnetically active portions of first blades located proximately thereto in order to drive the impeller along a rotational direction.

12. The electronic device of claim 11, wherein each stacked inductor group further includes at least a portion of a printed circuit board to which are printed the first coil, the second coil, and a switch configured to allow a selective use of one or more coils.

13. The electronic device of claim 11, wherein a first blade having a magnetically active portion is directly aligned with a first stacked inductor group when second and third blades having magnetically active portions nearest the first blade are not directly aligned with any stacked inductor group, and wherein the second blade is driven along the rotational direction by a second stacked inductor group that attracts the second blade and the third blade is driven along the rotational direction by a third stacked inductor group that repels the third blade when the first blade is directly aligned with the first stacked inductor group.

14. The electronic device of claim 11, further comprising:
a processor located within the outer housing and adapted to control current to the coils of each stacked inductor group in order to manage operation of the impeller thereby.

15. The electronic device of claim 14, wherein the processor is configured to:
detect when a heat reduction is needed in the electronic device,
determine a level of heat reduction to apply when the processor detects that the heat reduction is needed, and
energize one or more coils in each of multiple stacked inductor groups selected from the plurality of stacked inductor groups, wherein the number of coils that are energized in each of the multiple stacked inductor groups corresponds to the level of heat reduction to be applied determined by the processor.

16. A method of managing heat for an electronic device, the method comprising:
monitoring heat in the electronic device;
detecting when a heat reduction is needed in the electronic device;
determining a level of heat reduction to apply when it is detected that the heat reduction is needed, wherein at least two or more different levels of heat reduction are available; and
energizing one or more coils in each of multiple stacked inductor groups selected from a plurality of stacked inductor groups in a fan assembly within the electronic device, the fan assembly including an impeller having a plurality of blades including first blades having magnetically active portions and second blades not having a magnetically active portion, wherein predetermined numbers of the second blades are located circumferentially between each pair of circumferentially adjacent blades of the first blades, and the predetermined numbers of the second blades are not all equal, wherein the plurality of stacked inductor groups have multiple coils that are radially disposed about the impeller, wherein the number of coils that are energized in each of the multiple stacked inductor groups corresponds to the determined level of heat reduction to be applied.

17. The method of claim 16, wherein the energizing includes a cycle at each energized coil that includes a positive magnetic force, a negative magnetic force, and no magnetic force.

* * * * *